UNITED STATES PATENT OFFICE.

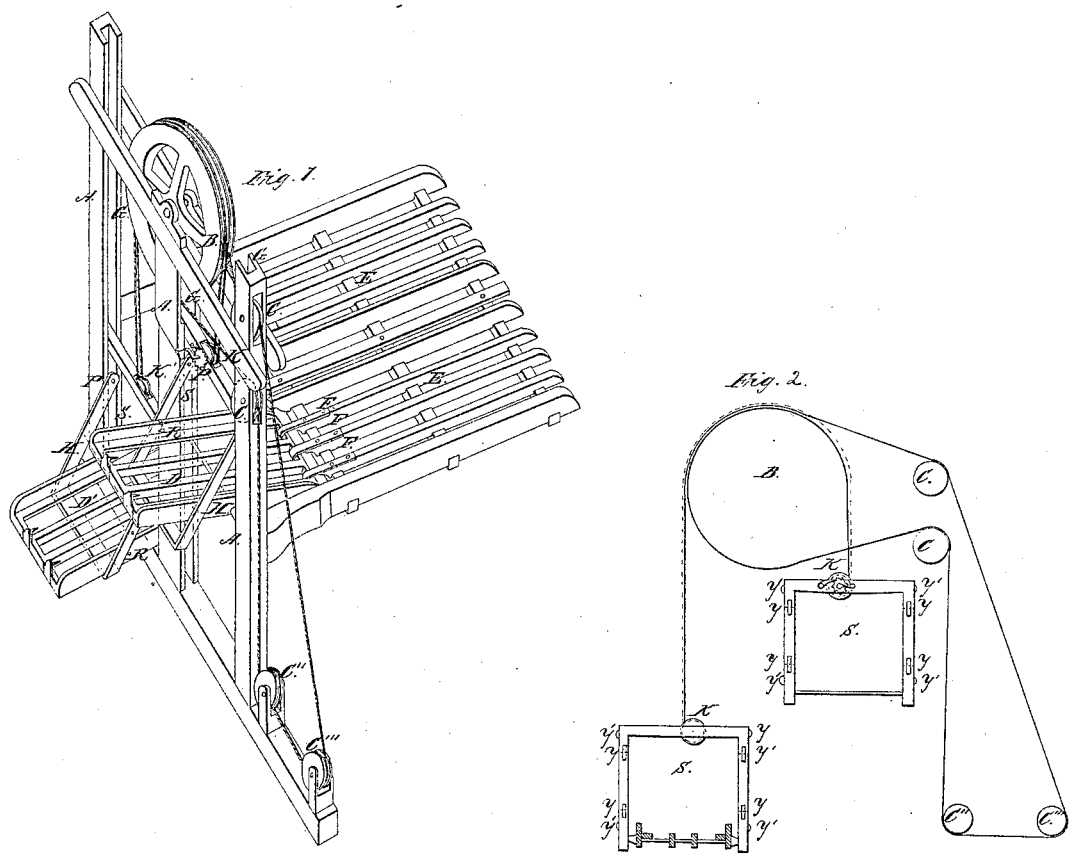

JOHN WAGNER, OF PHILADELPHIA, PENNSYLVANIA.

MACHINE FOR HOISTING ICE.

Specification of Letters Patent No. 25,691, dated October 4, 1859.

*To all whom it may concern:*

Be it known that I, JOHN WAGNER, of the city and county of Philadelphia, State of Pennsylvania, have invented a new and useful Improvement in Machines for Hoisting Ice; and I do hereby declare the following to be a full, clear, and exact description of the same, reference being had to the annexed drawings, making part of this specification, in which—

Figure 1, represents a perspective view of my improved machine. Fig. 2 represents a front view of the slides on which the carriages are hung; showing the antifriction rollers; the attachments of the ropes for counter-balancing, raising and lowering the slides; also showing the pulley and ratchet arrangement for shortening the ropes.

My invention relates to machines for raising or hoisting ice and delivering it into ice houses, and consists in attaching antifriction rollers to the slides on which the carriages are hung; and the peculiar manner of hanging, supporting and tilting the carriages.

In Fig. 1, A, A, A represent the frame of my improved ice hoister. B a large pulley pivoted in the frame of the machine. C, C', C'', and C''' are smaller pulleys for guiding the rope which hoists the carriages.

D and D' are the carriages upon which the ice rests when being raised.

E and E' are the long chutes leading into the ice house. The chutes E and E' are provided at their ends next to the carriages with metallic projections shown on E at F, F, F. The carriages D and D' are pivoted or hung on the slides S and S' in such a manner that the heavier end of the carriage will be in front. The slides S and S' run freely in guides in the frame of the machine shown at G, G, G, and are provided with anti-friction roller shown in Fig. 2 at y, y, y, &c.

Two supporters H and H' attached to the slides S and S' by pivots as shown at P, P, are allowed to swing under the heavier ends of the carriages which prevent those ends from falling. These supporters are prevented from falling in by pins in the carriages shown at R and R. These pins are placed in such a position that when the supporters rest against them and the carriages rest on the supporters, the carriages have a gentle inclination forward; that is they are lower in front, so that when the ice is placed on them it keeps at that end of the carriage and is prevented from sliding off by pins shown at T, T, and J. J. The front end of the carriages are prevented from rising too high by the pins x and x in the supporters.

K and K' Fig. 2 are rollers pivoted in the slides S and S' for the purpose of rolling up or shortening the counterbalancing and hoisting ropes and are provided with cranks, clicks and ratchets.

A rope or chain is attached to the roller K (colored blue in the drawing) passes up over the large pulley B and is attached to the roller K' so that one slide and carriage will counterbalance the weight of the other. Another rope or chain (colored red in the drawing) is attached to the roller K passes up and around the pulley B over the small pulley C' down under the pulleys C'' and C''' thence up over the pulley C, over the pulley B thence down and is attached to the roller K'.

The operation of my improved machine is as follows: The carriage D' which is now resting on the ground is loaded with ice. A horse is attached to the rope or chain somewhere between the pulleys C''' and C'' and as he pulls toward the pulley C'' he raises the carriage D' to the position relative to its chute shown by the carriage D; that is, the end of the carriage next to the chute having corresponding excavations to the projections on the chutes, shown in E at F, F, F which projections catch into the excavations and depress that end of the carriage, this sudden depression starts the ice on the carriage causing the ice to slide down on the chute and from there into the ice house. While the carriage D' was being raised the carriage D would lower by its own weight, and at the first movement it would fall upon the supporter H as a consequence of its front end being the heavier.

The counterbalancing rope (which is shown blue in the drawing) is only intended to counterbalance the weight of slides and carriages. The hoisting rope (which is shown red in the drawing) should be a little loose, so that when the horse is pulling, that part of the rope which is in front of the point at which he is attached will be slack, so enabling the horse to get directly in front of the pulley and also overcoming the inconvenience which has heretofore been occasioned the horse of the rope striking against his side.

The pulleys C″ and C‴ should be placed so that the distance between them should be greater than the distance from the ground to the chutes.

As the ice house fills the chutes E and E′ have to be raised and the ropes shortened, which by the old method of tying occasioned a great loss of time as the ropes would stretch and would require altering when the chutes had not been moved. By my plan the ropes are kept at their proper length without difficulty.

Having thus described my improvements, what I claim as my invention and desire to secure by Letters Patent is:

1. The combination of the slides, carriages, supporters and projections on the chutes arranged and operating in the manner and for the purpose as hereinbefore specified.

2. The antifriction rollers Y, Y, Y′ &c. in connection with the slides arranged and operating as hereinbefore specified.

3. The counterbalancing rope or chain and rollers K and K′ in combination with the pulley B and the slides S and S′ operating in the manner and for the purpose as hereinbefore specified.

JOHN WAGNER.

Witnesses:
J. Ewing Child,
Jno. B. Kenny.